(12) United States Patent
Bailey et al.

(10) Patent No.: US 6,680,077 B1
(45) Date of Patent: Jan. 20, 2004

(54) PROCESS FOR PRODUCING MEAT PRODUCTS

(75) Inventors: Susan C. Bailey, Norfolk (GB); Philippe R. Merlin, Arnouville (FR); Evin D. Van Griethuysen, Cambridge (GB)

(73) Assignee: Kerry Ingredients (UK) Limited, Surrey (GB)

( * ) Notice: Subject to any disclaimer, the term of this patent is extended or adjusted under 35 U.S.C. 154(b) by 0 days.

(21) Appl. No.: 09/646,422

(22) PCT Filed: Mar. 18, 1999

(86) PCT No.: PCT/GB99/00725

§ 371 (c)(1), (2), (4) Date: Feb. 2, 2001

(87) PCT Pub. No.: WO99/47007

PCT Pub. Date: Sep. 23, 1999

(30) Foreign Application Priority Data

Mar. 18, 1999 (GB) ................................. 9805808

(51) Int. Cl.⁷ ............................. A23L 1/318; A23B 4/22
(52) U.S. Cl. ........................................................ 426/58
(58) Field of Search ............................... 426/55, 56, 58, 426/61, 574, 645

(56) References Cited

U.S. PATENT DOCUMENTS 5,989,601 A * 11/1999 Bodenas et al. .............. 426/59

FOREIGN PATENT DOCUMENTS

| DE | 3500914 | 7/1986 |
| DE | 4035836 | 5/1992 |
| DK | 166250 | 3/1993 |
| EP | 0770336 | 5/1997 |
| WO | 9728702 | 8/1997 |

OTHER PUBLICATIONS

Chemical Abstracts, vol. 105, No. 19, (Nov. 10, 1986), Derwent Publications Ltd., London, GB, "Novel high protein products from beef".

* cited by examiner

Primary Examiner—Keith Hendricks
(74) Attorney, Agent, or Firm—Birch, Stewart, Kolasch & Birch, LLP

(57) ABSTRACT

Meat products are produced at high yield without phosphate supplements by using define starter cultures.

15 Claims, No Drawings

PROCESS FOR PRODUCING MEAT PRODUCTS

This application is the national phase under 35 U.S.C. § 371 of PCT International Application No. PCT/GB99/00725 which has an International filing date of Mar. 18, 1999, which designated the United States of America.

The present invention relates to processes for producing meat products at high yield, to cured meat products produced without phosphate supplements and to meat products (e.g. cooked meat products) produced by such processes.

The water holding capacity (WHC) of meat is defined as its ability to retain the endogenous tissue water present in its structure. The water binding capacity (WBC) is defined as the ability of meat to bind added water. Both play a crucial role in meat manufacture.

Many different factors determine the WHC of meat. These include intrinsic factors, such as the age, gender, species, breed, muscle type, fat levels, prevalence of large blood vessels, size of the source animal, post-mortem physiological state and pH. Extrinsic factors include antemortem procedures (such as feeding patterns and physical activity prior to slaughter), method of slaughter, preservation techniques and adjuncts (such as added electrolytes).

Phosphates (usually polyphosphates) have been used in the meat industry for decades to increase the water retention properties of meat products. Although their effect is not fully understood, several possible mechanisms for phosphate activity have been proposed. These include the influence of changes in pH value, solubilization of proteins, effects of ionic strength and specific interactions of phosphate anions with divalent cations and myofibrillar proteins.

While phosphates have been approved for use in many different meats (for example, 5 g/kg is accepted in certain types of hams in Europe), their use in certain types of meats is not permitted. For example, the meat industry in France, Germany, Italy and Poland does not use phosphates in certain cooked ham products (such as Jambon Superieur).

There is therefore a need for meat products which can be produced at high yield but which do not contain phosphate supplements. However, attempts to replace phosphates with supplements exhibiting similar yield-improving properties without adding to costs have been unsuccessful.

It has now surprisingly been discovered that starter cultures may increase the yield of a cooked whole muscle meat product, and that starter cultures have hitherto unrecognized utility in the production of Jambon Superieur.

Thus, according to a first aspect, the present invention there is provided a process for producing a cooked whole muscle meat product at a yield of at least 90% comprising the step of incubating the meat with a defined starter culture.

In a second aspect, the invention relates to a process for producing a Jambon Superieur meat product comprising the step of incubating the meat with a defined starter culture.

Preferably, the meat is produced at a yield of at least 90%, and the processes of the invention may increase the water binding capacity of the meat product (thereby increasing yield). In particularly preferred embodiments, the meat product is produced at a yield of at least 95%, at least 100%, greater than 100%, at least 110%, at least 120% or to en extent which is substantially equivalent to that obtainable through the use of phosphate supplements.

The process is preferably conducted in the absence of supplementary phosphates. The term supplementary phosphates is intended to define phosphates (especially polyphosphates) added as a supplement during processing to increase the phosphate content of the meat (and so increase yield). Thus, endogenous phosphates lost during processing may be "added back" in processes which are conducted in the absence of supplementary phosphates.

Any meat may be used in the process of the invention, but particularly preferred is a ham. In the second aspect of the invention, a Jambon Superieur is produced. The term "Jambon Superieur" is a term of art which defines a particular class of high quality cooked hams (which are produced without the addition of supplemental phosphates).

Any of a wide variety of starter cultures may be used in the processes of the invention, and those skilled in the art will be able to identify appropriate defined cultures by routine trial and error. Preferably the defined starter culture comprises a single species of microorganism or a mixture of two or more species of microorganism.

Particularly preferred are starter cultures comprising one or more Staphylococcus spp. and one or more Lactobacillus spp.

Preferably, the Lactobacillus spp. used in the invention are selected from homofermentative Lactobacillus spp. (as defined in Bergey's Manual of Determinative Bacteriology, 8th Edition).

The optimum amount of each component of the starter culture may be readily determined by routine trial and error, and varies inter alia according to the type of meat, the desired flavour characteristics, the conditions under which the meat is to be cured and the identity of the bacterial species selected.

The starter culture is preferably injected into the meat prior to incubation. This ensures that the culture becomes evenly distributed throughout the body of the meat. However, it may also be introduced by any other suitable means, such as by diffusion, massaging and tumbling.

In preferred embodiments, the starter culture is introduced into the meat in a brine carrier (optionally wherein the brine comprises salt and sugar, e.g. NaCl and glucose). The carrier is preferably injected to about 10% by weight (with respect to the meat), for example to produce a final salt concentration in the meat of about 2% w/w.

Preferably, the meat is tenderized after injection with the starter culture.

The meat may be tumbled (e.g. for about 20 hours) after injection, optionally at a temperature of at least 5° C. The tumbling is optionally followed by resting (e.g. for about 4 hours).

The meat may be cooked after incubation with the starter culture, preferably to a core temperature of between 60 and 70° C. (e.g. about 67° C.). Following cooking, the meat may be cooled for example by showering under water (e.g. at a temperature of 5–15° C.) immediately after cooking, optionally followed by chilling or freezing. However, curing processes (such as salting, drying, smoking etc.) may also be employed.

The meat is preferably cured at a salt level of 1.5–2.5% (e.g. about 2.4% w.r.t. the final weight of the product), a pH of about 5–8 and tumbled at between 4–15° C.

Genetic effects play a very important role in carcass composition, and meat quality attributes like colour, tenderness and processing yield can be affected by genotype. Thus, in particularly preferred embodiments where the meat product is a ham, the meat is derived from a halothane negative and/or RN negative and/or RN negative/positive (Redement Napole or acid meat gene) pig.

The invention also contemplates a meat product obtainable by (or obtained by) the process of the invention.

Also contemplated is a meat product characterized in that the product is a cooked whole muscle meat incubated with a defined starter culture and produced at a yield of at least 90%.

Where the meat product is a cured ham, the meat may be processed by the steps of: (a) cutting and trimming; (b) injecting with the starter culture in a salt solution carrier; (c) tenderizing; (d) tumbling; (e) resting; (f) moulding; (g) cooking and cooling.

In addition to increasing the yield of the meat product, the starter cultures for use in the invention may also contribute to the organoleptic properties of the meat product (e.g. colour, flavour and texture), while also reducing cooking loss (purge).

The invention will now be described with reference to an example. This example is for illustrative purposes only and is not intended to limit the invention in any way.

EXAMPLE

Preparation of a Jambon Superieur

Cutting and trimming

Five portions (each of 2.5 kg) of fresh pork leg having a pH of between 5.6 and 5.8 were deboned and deskinned. All fat, gristle, blood spots etc. were removed and the meat trimmed to produce five 2 kg portions of meat suitable for curing. The portions were then chilled.

Injection

A 15 kg brine solution containing the starter culture was injected at 1 psi to achieve a 10% increase in meat weight using a Gunther PI13 injector. The portion of meat was then tenderized using a Jaccard™ meat tenderizer.

| Brine formulation: | % |
|---|---|
| Water | 66.7 |
| Brine | 6.0 |
| Salt | 24.2 |
| Nitrite | 0.6 |
| Flavour | 1.0 |
| Starter culture | 1.5 |

The starter culture contained 11.11 g of each of *Staphylococcus carnosus, Staphylococcus xylosus* and *Lactobacillus curvatus* (total 33.3 g) in 333.33 g water. It was stored at −18° C. prior to use, and then suspended in water (25° C. or higher), equilibrated for about 30 min, mixed with cold brine (at 5° C. or higher) and then immediately injected into the meat.

Tumbling

The meat was placed in a 20 kg baffled vacuum tumbler (Inject Star MC10/20) and placed under vacuum. The tumbler was then placed in a chilled unit at 5° C. (or higher: colder temperatures inactivate or kill the strater culture) and the meat tumbled for 3.5 hours at 7 revolutions per minute, followed by ten minutes resting and ten minutes rotating alternately clockwise and counter-clockwise for 16.5 hours. The meat was then rested under chilled conditions for about three hours.

Moulding

The vacuum in the tumbler was released and the meat removed. It was then moulded into five equal portions and wrapped into polythene sheets covered in small holes, tied in mesh stocking and placed into a Cryovac™ bag. A Mainca Vector MV5 single chamber vacuum sealer was then used to vacuum the meat portions for 2 minutes on 100% vacuum with the bag unsealed and then vacuumed for a further 30 seconds to seal the bag. Moulding may also be achieved through use of a thermoshrinkable pouch.

Cooking

The meat was placed on the middle shelf of a Rapidaire™ Humidity Oven and cooked at 64 degrees centigrade until an internal temperature of 55 degrees centigrade was reached (about 3 hours) and then at 74 degrees centigrade until and internal temperature of 68 degrees centigrade was reached (about 3 hours). The meat was then removed and cooled to 4–10° C. in cold running water by plunging, before being refrigerated overnight.

The Jambon Superieur product exhibited significantly higher WHC (i.e. a higher yield) and low purge on cooking relative to a control ham which was prepared without treatment with the starter culture mixture.

What is claimed is:

1. A process for increasing the water binding capacity of a cooked whole muscle meat product, said process comprising the steps of:

(a) providing an uncooked whole muscle meat portion and injecting a starter culture comprising one or more Staphylococcus spp. and one or more Lactobacillus spp. into said uncooked whole muscle meat portion prior to incubation of said culture to provide a meat product portion;

(b) incubating the meat product portion of step (a); and (c) cooking the meat product portion of step (b),
      wherein the process is conducted in the absence of supplementary phosphates, the cooked meat product has a weight which is greater than 100% of the weight of the uncooked meat portion, and the meat portion is cured to a salt level of 1.5–2.5% with respect to the weight of the final product.

2. A process for increasing the water binding capacity of a Jambon Superieur meat product, said process comprising the steps of:

(a) providing an uncooked whole muscle meat portion and injecting a starter culture comprising one or more Staphylococcus spp. and one or more Lactobacillus spp. into said uncooked whole muscle Jambon Superieur meat portion prior to incubation of said culture to provide a meat product portion;

(b) incubating the meat product portion of step (a); and (c) cooking the meat product portion of step (b),
      wherein the cooked meat product has a weight of at least 90% of the weight of the uncooked meat portion, and the meat portion is cured to a salt level of 1.5–2.5% with respect to the weight of the final product.

3. The process of claim 1, wherein the meat is a ham.

4. The process of claim 1, wherein the starter culture is introduced into the meat in a brine carrier.

5. The process of claim 1, wherein the meat is tenderized after injection with the starter culture.

6. The process of claim 1, wherein the meat is tumbled after injection.

7. The process of claim 6, wherein the meat is rested after tumbling.

8. The process of claim 1, wherein the meat is cooked to a core temperature of between 60 and 70° C.

9. The process of claim 8, wherein the meat is cooled by showering under water immediately after cooking.

10. The process of claim 9, wherein the meat is chilled or frozen after showering.

11. The process of claim 1, wherein the meat has a pH of about 5–8 and is tumbled at between 4–15° C.

12. The process of claim 1 wherein the meat is derived from a halothane negative pig and/or an RN negative pig and/or an RN negative/positive pig.

13. A meat product obtained by the process of claim 1 or claim 2.

14. A cooked whole muscle meat product comprising a starter culture comprising one or more Staphylococcus spp. and one or more Lactobacillus spp. and containing no supplementary phosphates, wherein the meat product as cooked has a weight of at least 90% of the corresponding uncooked meat.

15. The process of claim 2, wherein the uncooked whole muscle meat portion provided weighs 2 kilograms.

* * * * *